F. B. MORAN.
FAUCET.
APPLICATION FILED JULY 2, 1918.
1,313,105.
Patented Aug. 12, 1919.
2 SHEETS—SHEET 1.
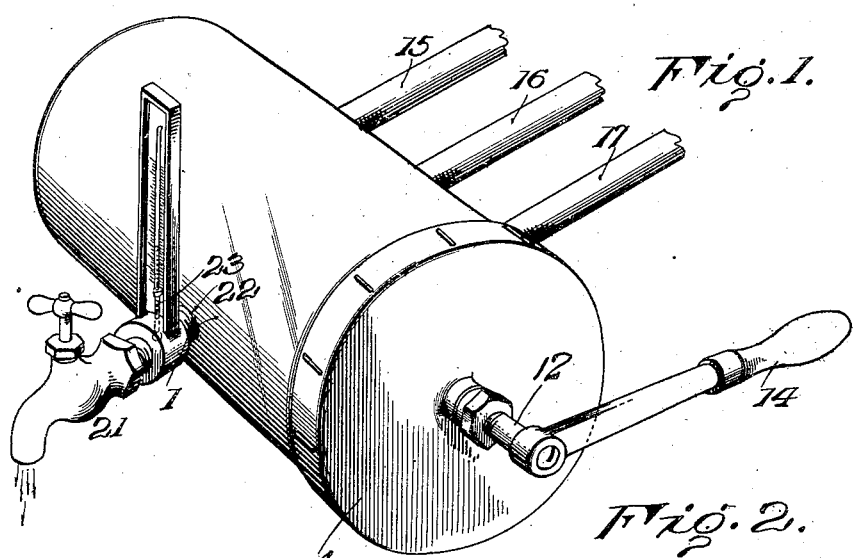
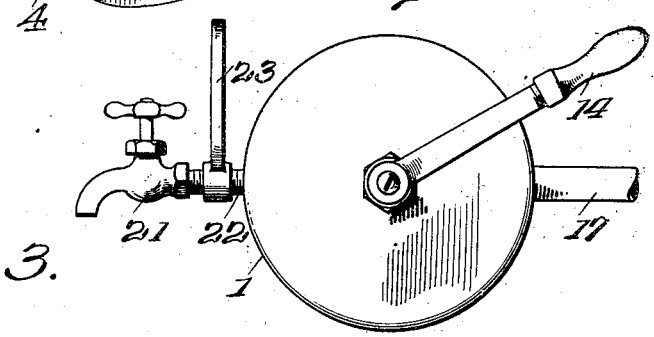
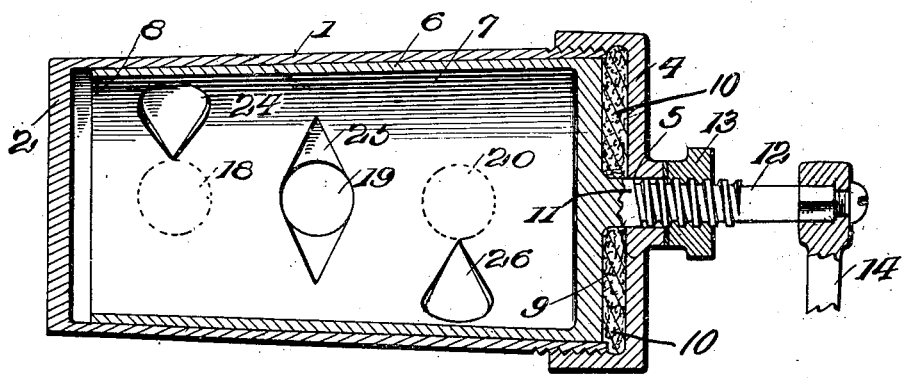
Inventor
Frank B. Moran.
By Lacey & Lacey, Attorneys F. B. MORAN.
FAUCET.
APPLICATION FILED JULY 2, 1918.
1,313,105.
Patented Aug. 12, 1919.
2 SHEETS—SHEET 2.
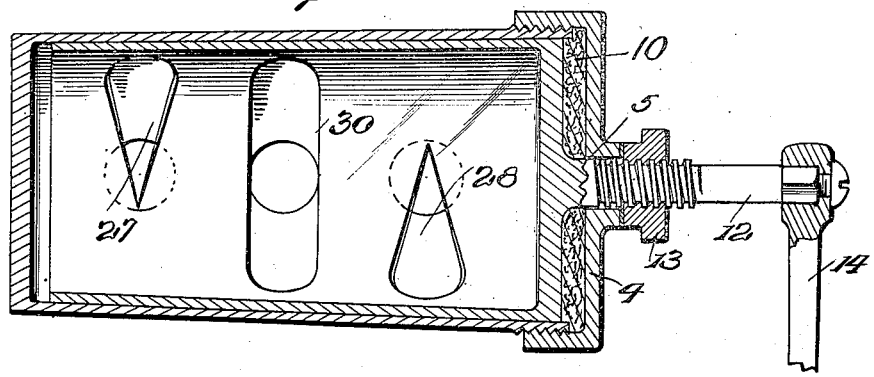
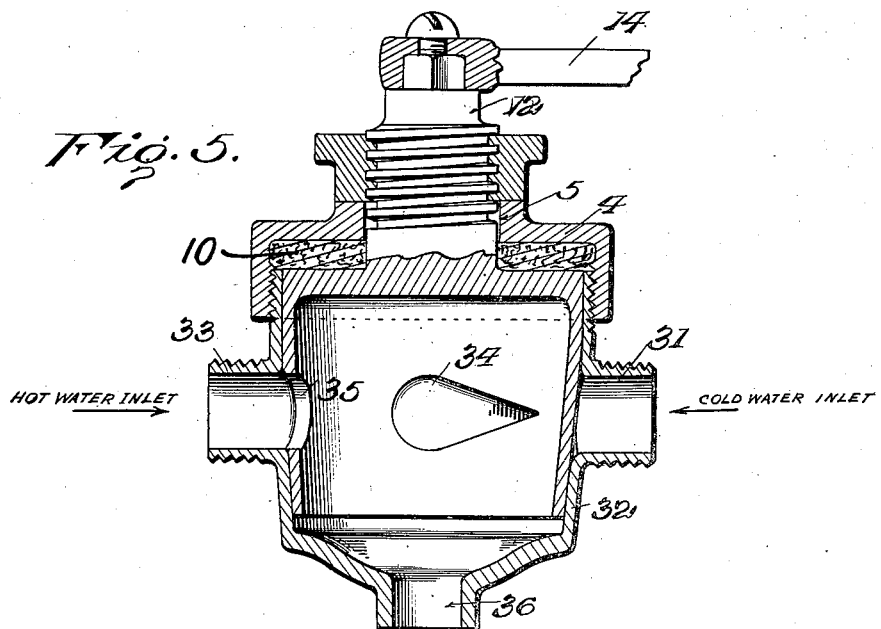
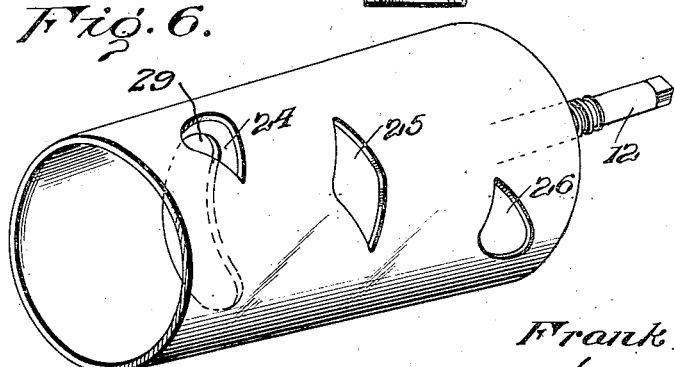
Inventor
Frank B. Moran.
By
Lacey & Lacey, Attorneys

UNITED STATES PATENT OFFICE.

FRANK B. MORAN, OF DALLAS, TEXAS.

FAUCET.

1,313,105. Specification of Letters Patent. Patented Aug. 12, 1919.

Application filed July 2, 1918. Serial No. 243,040.

*To all whom it may concern:*

Be it known that I, FRANK B. MORAN, a citizen of the United States, residing at Dallas, in the county of Dallas and State of Texas, have invented certain new and useful Improvements in Faucets, of which the following is a specification.

This invention relates to faucets and more particularly to a faucet of the type designed to deliver either hot or cold water or a mixture of hot and cold water, and the primary object of the present invention is to provide a faucet of this type so constructed that water of any desired temperature may be obtained, the faucet being, therefore, especially adapted for use in connection with shower and spray baths, full bath tubs, sitz baths, lavatories, kitchen sinks, hydrotherapeutic apparatus, and in fact wherever it is desired to obtain a flow of water of a desired or specified temperature.

One form of the invention has as its primary object the supplying of water ranging in temperature from refrigerated to highly heated.

It is a further object of the invention to provide a faucet which may be first adjusted so as to admit to a mixing chamber equal or different volumes of water from different sources of supply, at which sources the temperature of the water is different in each instance, the water after mixture and at the desired mean temperature, being drawn off through an auxiliary faucet.

In the accompanying drawings:

Figure 1 is a perspective view of one form of faucet embodying the present invention;

Fig. 2 is a side elevation thereof;

Fig. 3 is a vertical longitudinal sectional view through the structure shown in Fig. 1;

Fig. 4 is a view similar to Fig. 3 illustrating a modified form of the invention;

Fig. 5 is a similar view illustrating a further modification;

Fig. 6 is a perspective view of the body of the faucet shown in Fig. 3, removed from its casing.

The device embodying the present invention may in itself serve as a faucet or it may serve as a mixing valve for a faucet, and as the novelty of the invention resides in the means provided for effecting a mixture of water from different sources at different temperatures, the device will hereinafter be generally considered as a mixing valve.

The casing of the valve is indicated by the numeral 1 and the said casing is interiorly of frusto-conical form and in that form of the invention shown in Figs. 1, 2 and 3 of the drawings is closed at one end as indicated by the numeral 2, the casing at its other end being exteriorly threaded for the application to the said end of a cap 4 which closes this end of the casing also, the cap being formed, however, centrally with an opening 5 for the passage of the stem of the valve body as will be presently explained. The valve body is indicated in general by the numeral 6 and is exteriorly of frusto-conical form so as to fit snugly and yet rotatably within the casing 1. The valve body 6 is hollow so as to provide a mixing chamber indicated by the numeral 7, which chamber may be open at one end as shown, which end is the minor end or the one located next adjacent the closed end 2 of the valve casing. The other end of the valve body is, however, closed as indicated at 9, and a suitable packing 10 is arranged within the space between the said closed end 9 of the valve body and the cap 4, as clearly shown in Fig. 3 of the drawings, this packing being compressed by tightening of the cap so as to form a water-tight joint and prevent leakage of water around the valve stem, which stem is indicated by the numeral 12 and is preferably integral with the end 9 of the valve body and, of course, located axially with respect to the said body. The stem 12 fits rotatably and yet snugly within the opening 5 in the cap 4 and the stem is preferably threaded, for the application thereto of an adjusting nut 13 which may be tightened or loosened for the purpose of adjusting the valve body longitudinally within its casing. For example, if the cap 4 is tightly threaded into place and it is found that the valve body turns with difficulty in its casing 1, the nut 13 may be tightened so as to slightly draw the valve body in the direction of the cap 4 whereupon it will rotate more freely when the stem is turned. To provide for turning of the stem, a handle 14 is connected with the end thereof, as clearly shown in Figs. 1 and 2 of the drawings.

In the drawings, the numerals 15, 16 and 17 indicate water supply pipes which lead respectively from a source of hot water supply, the hydrant supply main, and a source of refrigerated water supply. These pipes are respectively threaded into openings 18, 19 and 20 formed in one side of the valve casing 1, the openings being in alinement longitudinally of the casing and being preferably all of the same size. The numeral 21 indicates a faucet of the ordinary type which is fitted into an opening 22 formed in the other side of the casing 1 and preferably diametrically opposite the opening 19. If desired, a thermometer 23 of any suitable type may be provided between the opening 22 and the faucet 21, as shown in Figs. 1 and 2 of the drawings so as to register the temperature of the water passing from the mixing chamber 7 to the said faucet 21. In order that in the rotary adjustment of the valve body 6, water from the sources 15, 16 and 17 may be admitted to the mixing chamber 7, from any one of the three sources alone or from two of said sources simultaneously, the valve body 6 is formed with openings indicated by the numerals 24, 25 and 26 and located so as to communicate respectively with the openings 18, 19 and 20 in the rotary adjustment of the said valve body. At one end of the opening 24 the wall thereof is slightly more than semi-circular in extent and of substantially the same diameter as the opening 18, and this is true also of one end of the opening 26. These said ends of the openings are the relatively remote ends thereof, and the said openings 24 and 26 are gradually decreased in width, or in other words, have their opposite side walls converging in the direction of the circumference of the wall of the valve body 6 and in the direction of their relatively adjacent ends. The opening 25 is of substantially elliptical form being at its intermediate portion of a diameter or width substantially equal to the diameter of the opening 19 and from its intermediate portion having its opposite side walls converging as clearly shown in Figs. 3 and 6 of the drawings. The opening 25 is located intermediate the openings 24 and 26 and the arrangement of these openings is furthermore such that the extreme end of the opening 25 which is next adjacent the opening 24, terminates at a line extending longitudinally of the valve body and chordal to the adjacent side of the circle of which the wall defining the major end of the opening 24 is an arc. Likewise the other extreme end of the opening 25 terminates at a similar line chordal to the adjacent side of the circle of which the wall defining the major end of the opening 26 is an arc.

It will be evident from the foregoing that, assuming the valve body 6 has been turned to such position that all of the openings therein are out of communication with the corresponding openings in the valve casing 1 and that the major end of the opening 24 is adjacent the lower side of the opening 18 in Fig. 3 of the drawings, when the valve body 16 is rotated rearwardly in the said figure, the opening 24 will be brought into communication with the opening 18 until the whole of the opening 18 is uncovered whereupon hot water will be admitted to the mixing chamber 7 from the pipe 15 and may be drawn off through the faucet 21. Upon continued rotation of the valve body in the said direction, the narrowing portion of the opening 24 will be moved over the opening 18 thus gradually diminishing the volume of hot water admitted to the mixing chamber. At the same time the upper narrowing portion of the opening 25 in the said figure will be moved across the opening 19 so that as the supply of hot water is diminished, a supply of water at supply-main temperature will be admitted to the mixing chamber in inverse ratio until finally the openings 24, 25 and 26 will assume the positions with relation to the respective openings 18, 19 and 20 illustrated in the said Fig. 3, at which time the supply of hot water to the mixing chamber will be entirely cut off and the full volume of water will be supplied to the said chamber through the pipe 16 which leads from the supply main. Continuing the rotation of the valve body, the lowering narrowing portion of the opening 25 will be gradually moved across the opening 19 and the narrowing portion of the opening 26 will be gradually moved across the opening 20 so that in such continued rotation of the valve body, the supply of water at supply-main temperature will be gradually diminished and a supply of refrigerated water to the mixing chamber will be gradually increased in inverse ratio to the diminishing supply of water through the pipe 16. This rotation of the valve body may be continued until all of the openings in the valve body are out of communication with the respective openings in the valve casing and the major end of the opening 26 is located above the upper side of the opening 20 in Fig. 3. If, when it is again desired to draw water from the mixing chamber, a supply of hot water is desired, the valve body will be rotated in the same direction as heretofore mentioned, but if a supply of refrigerated water is desired or a supply at a relatively low temperature, the valve body will be rotated in the opposite direction so that the opening 26 will first be brought into communication with the opening 20 instead of the opening 24 being brought into communication with the opening 18 as in the specific example above given.

The valve shown in Fig. 4 of the drawings embodies the same principles as the form of valve just described, except that in this modified form there is a source of hot water supply through an inlet 27 in the valve casing and a supply of water at supply-main temperature through an inlet 28 formed in the said casing, there being, however, no supply of refrigerated water. Of course, in order to permit of discharge of water from the mixing chamber both in the first described embodiment of the invention and in the modified form shown in Fig. 4, it is necessary that the valve body be formed with a circumferentially extending opening, indicated in the former instance by the numeral 29, and in the latter instance by the numeral 30 so that whenever any of the inlet openings in the valve body are in communication with the respective openings in the valve casing, the outlet openings 29 and 30 in the two forms of valve will be in communication with the respective outlet openings in the valve casings.

In the forms of the invention above described the outlet may be from that side of the casing opposite or from the same side as the side at which the water supply pipes from the different sources of supply communicate with the said casing. However, a modified structure such as shown in Fig. 5 of the drawings may be employed and in this structure the numeral 31 indicates a cold water inlet located at one side of a vertically disposed casing 32 which corresponds in all essential features with the valve casings previously described, and the numeral 33 indicates a hot water inlet located at the opposite side of the said casing 32. Substantially the same form of valve body is employed in this modified structure and the same is provided with inlet openings 34 and 35 designed to communicate respectively with the openings 31 and 33. As the cold and hot water inlets in the valve casing are in this form of the invention, however, located at opposite sides of the casing, the openings 34 and 35 are so relatively positioned that their relatively adjacent ends will be their major ends. Furthermore, in this structure the minor end of the valve casing is not completely closed, but is suitably constructed to provide a discharge or outlet opening 36 presented, of course, in a downward direction.

Having thus described the invention, what is claimed as new is:

1. In a valve of the class described, a casing, and a valve body rotatably fitted in said casing, the casing having inlets for water at high, supply main, and refrigerated temperatures, the casing also having an outlet, and the valve body having an outlet and ports for communication with the respective ones of the inlets, said ports being arranged in stepped relation, the intermediate port having a maximum width midway its ends and the ports at the sides of said intermediate port being tapered in opposite directions with their minor ends their relatively adjacent ends.

2. In a valve of the class described, a casing, and a valve body rotatably fitted in said casing, the casing having a plurality of inlets and an outlet, and the valve body having an outlet and ports for communication with the respective inlets, an intermediate one of the ports being of maximum dimensions between its ends and decreasing in width in the direction of its said ends, and the ports at the opposite sides of the intermediate port being each of maximum width at one end and decreasing in width in the direction of its other end, the minor ends of the last-mentioned ports being their relatively adjacent ends.

3. In a valve of the class described, a casing, and a valve body rotatably fitted in said casing, the casing having a plurality of inlets and an outlet, and the valve body having an outlet and ports for communication with the respective inlets, an intermediate one of the ports being of maximum dimensions between its ends and decreasing in width in the direction of its said ends, and the ports at the opposite sides of the intermediate port being each of maximum width at one end and decreasing in width in the direction of its other end, the minor ends of the last-mentioned ports being their relatively adjacent ends, the said minor ends of the last-mentioned ports relatively overlapping the relatively adjacent ends of the intermediate ports.

In testimony whereof I affix my signature.

FRANK B. MORAN. [L. S.]